(12) United States Patent  
Heidrich

(10) Patent No.: US 7,026,541 B2
(45) Date of Patent: Apr. 11, 2006

(54) MOBILE PHOTOVOLTAIC BATTERY CHARGING STATION

(75) Inventor: Frank Heidrich, Braunschweig (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/467,556

(22) PCT Filed: Dec. 19, 2002

(86) PCT No.: PCT/DE02/04658

§ 371 (c)(1),
(2), (4) Date: Aug. 6, 2003

(87) PCT Pub. No.: WO03/061019

PCT Pub. Date: Jul. 24, 2003

(65) Prior Publication Data

US 2004/0069341 A1   Apr. 15, 2004

(30) Foreign Application Priority Data

Jan. 16, 2002 (DE) .......................... 202 00 609 U

(51) Int. Cl.
*H01L 31/045* (2006.01)

(52) U.S. Cl. ........................ 136/251; 136/244; 136/245; 136/246; 136/291; 136/293; 257/433; 257/436; 320/101

(58) Field of Classification Search ............... 136/244, 136/245, 251, 291, 293, 246; 257/433, 436; 320/101

See application file for complete search history.

(56) References Cited

U.S. PATENT DOCUMENTS 5,296,044 A * 3/1994 Harvey et al. ............... 136/245
5,701,067 A * 12/1997 Kaji et al. .................. 320/101
6,504,345 B1 * 1/2003 Sakurai et al. .............. 320/162

FOREIGN PATENT DOCUMENTS

| DE | 35 21 216 A | 5/1986 |
| DE | 295 01 583 U | 5/1995 |
| JP | 9-307125 A * | 11/1997 |
| JP | 10-270729 A * | 10/1998 |

* cited by examiner

*Primary Examiner*—Alan Diamond
(74) *Attorney, Agent, or Firm*—Michael J. Striker

(57) ABSTRACT

A solar cell plate for generating electric current includes a number of individual plates that can be moved in relation to one another to produce a convenient packing size.

4 Claims, 3 Drawing Sheets

MOBILE PHOTOVOLTAIC BATTERY CHARGING STATION

BACKGROUND OF THE INVENTION

There are known mobile solar panels that are provided to supply current to garden lamps, where the garden lamps are designed in the form of battery-powered units that can be electrically connected to solar panels.

The known solar panels are relatively bulky so that transporting and storing them is costly and awkward.

SUMMARY OF THE INVENTION

The current invention with the features of claim 1 has the advantage that a relatively large-area solar panel can be changed from the large-area, bulky dimensions of its functional position to a small packing size for transport or for a functional position with a minimal current efficiency, and is therefore particularly reliable and easy to maneuver and is also mobile.

The fact that the solar panel is comprised of individual panels similar to fan slats that can be pivoted around a common pivot axis or opened up like a fan, and can be folded back into a compact position from the fanned-out position, results in a simply designed, rugged solar panel that can be quickly, easily, and reliably transported.

The fact that the solar panel is supported in folding fashion on a base with an inclined surface makes it possible for the solar panel to be quickly, easily, and reliably brought into an optimal angular position in which the solar panel is oriented toward the sun so that the greatest possible electrical efficiency is assured.

The fact that the solar panel is fastened to a podium-like housing that supports the solar panel on the front side that constitutes the top panel of the podium and has a handle on the back side makes the solar panel a compact, particularly convenient box that can be rapidly and reliably set up.

The fact that the housing has a plug opening in back for the plug contact of a battery pack, in particular for electric tools, allows the box with the solar panel to be used in a particularly advantageous way as a mobile, solar-powered battery-charging station for operation on construction sites that do not have a high-voltage network.

The fact that the housing is equipped with charging electronics on the inside that are connected to the electric plug contacts in the plug opening makes the battery-charging station particularly rugged and insensitive to shock and impact under rough transportation conditions and with hard construction site use.

The fact that the housing has a charge control indicator assures it of functioning reliably as a battery-charging station.

Because the solar cell plates, which are arranged in a stack, are electrically coupled to one another and to the electrical contacts of the plug opening by means of electrical sliding contact, the solar panel has an effective maximal size, which results from the sum of the individual surface areas of the opened up solar cell plates.

The fact that the housing of the solar battery-charging station has ventilation slots prevents an overheating of the electric and electronic components contained inside, in particular the charging electronics, even at high outdoor temperatures.

BRIEF DESCRIPTION OF THE DRAWINGS

The current invention will be explained in detail below in conjunction with an exemplary embodiment and the accompanying drawings.

DETAILED DESCRIPTION OF THE PREFERRED EMBODIMENTS

Figure 1:
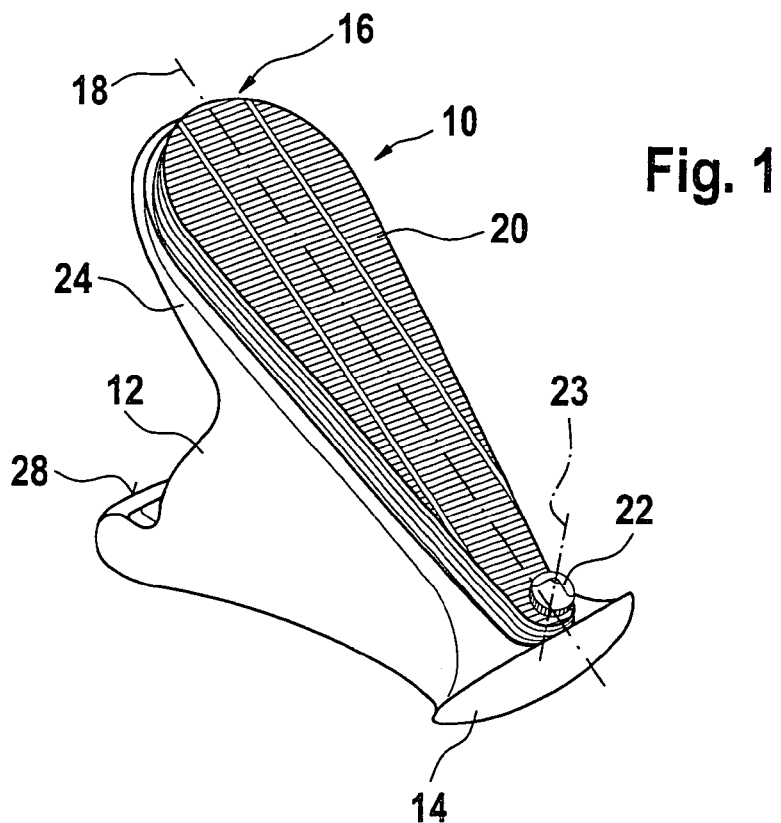
FIG. 1 shows a three-dimensional side view of the solar battery-charging station.
Figure 5:
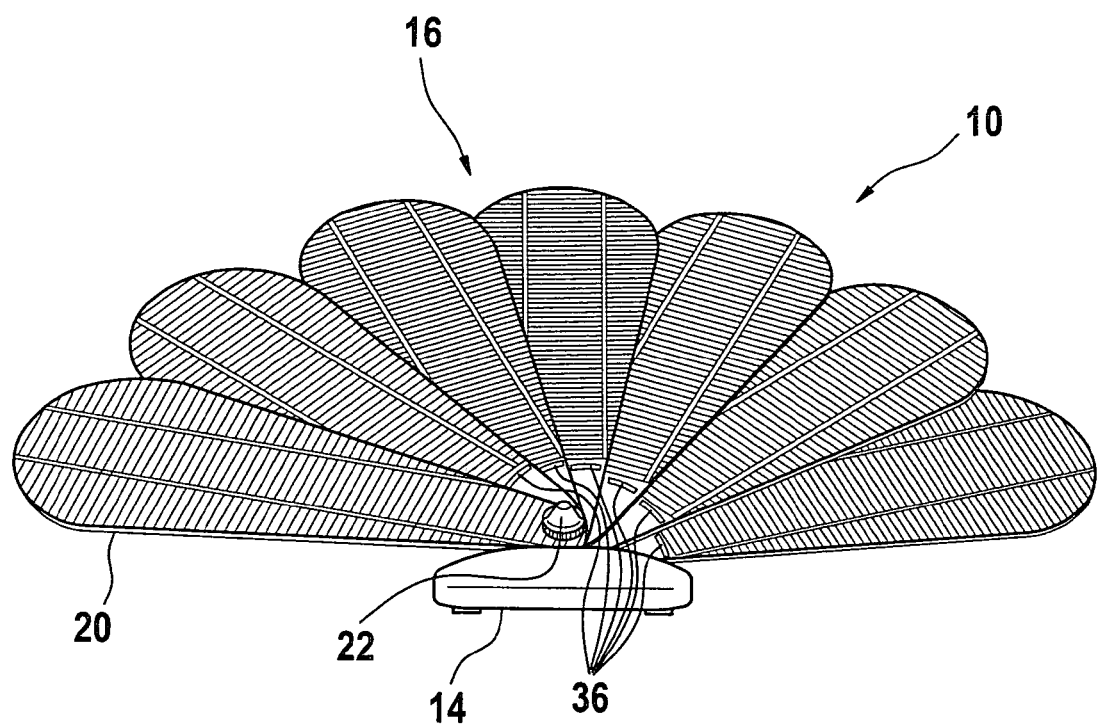
FIG. 5 shows the front view of the solar battery-charging station, with the solar cell plates spread out in the shape of a fan.

FIG. 1 is a three-dimensional view of the solar battery-charging station, with a stack 16 of solar cell plates 20 folded into the compact position, the uppermost solar cell plate of which is exposed, can be activated by light, and, like the remaining solar cell plates, is supported so that it can pivot around a swivel pin 22. The individual solar cell plates 20 can be moved independently of on another around the swivel pin 22, but are electrically connected to one another. They have identical dimensions and are sized so that after being spread out by pivoting around the swivel pin 22 in the manner shown in FIG. 5, they form a semicircular solar panel surface, which converts incident sunlight into electric current in proportion to its surface area.

The stack 16 of solar cell plates 20 is situated on an inclined surface 24 of the housing 12, which surface is similar to the top of a podium. The base 14 of the housing 12 can be securely placed on any surface.

In order to spread out, the uppermost solar cell plate 20 is pivoted in relation to the symmetry axis 18, all the way to the right or left while the remaining solar cell plates 20 axially adjacent to the uppermost one are "fanned out"0 to the left or right, describing a semicircle. The inside of the housing 12 contains electrical connecting means and electronic elements, not shown, that are usually provided in connection with battery-charging units. The housing 12 has a handle 28 in back, which is designed in the form of a spade handle.

Figure 2:
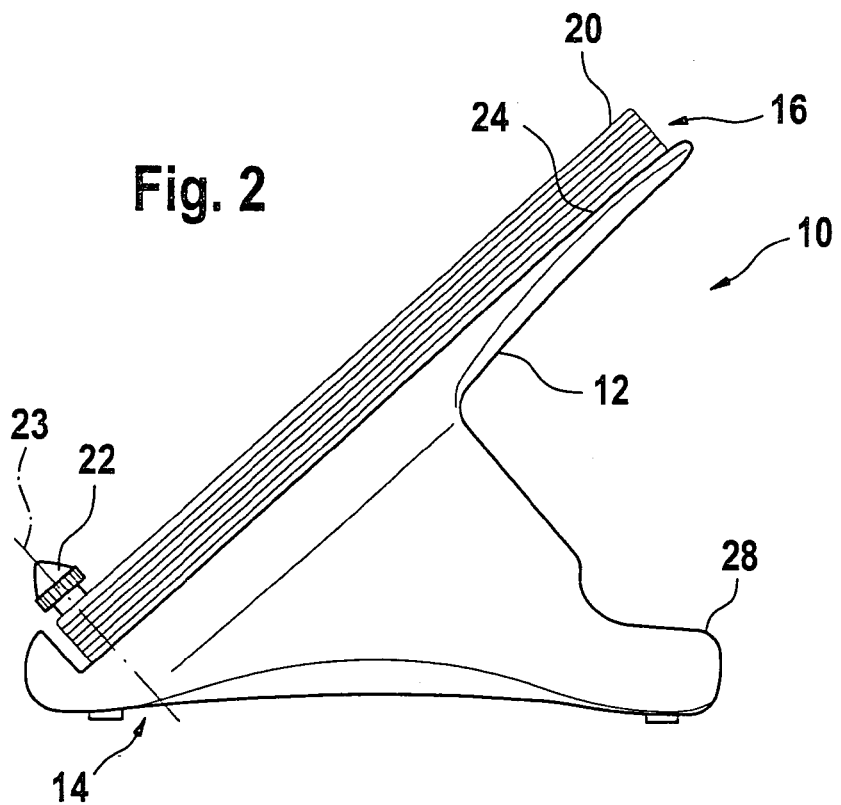
FIG. 2 shows the solar battery-charging station from the left.

FIG. 2 shows the details explained above in connection with FIG. 1, but no further mention of these details is required. FIG. 2 shows the position of the pivot axis 23 and of the swivel pin 22. It is also clear that the stack 16 is comprised of seven separate, identically designed solar cell plates 20.

Figure 3:
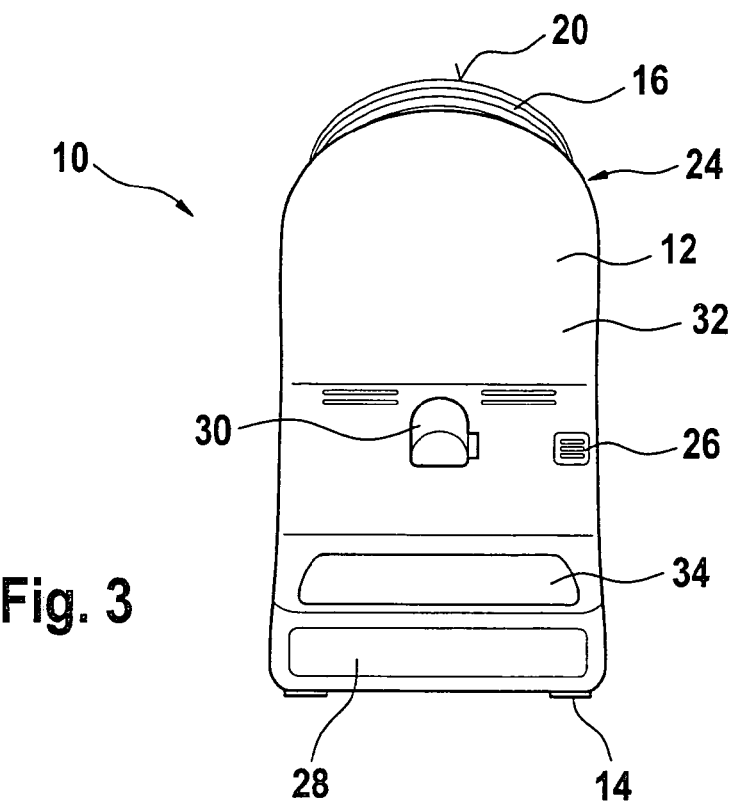
FIG. 3 shows the solar battery-charging station from behind.

FIG. 3 shows the back of the solar battery-charging station 10, where the back of the inclined surface 24 and of the housing 12 can be seen, as well as the design of the handle 28; a plug opening 30 is also shown, into which is plugged the plug terminal of a battery pack of the kind used for battery-operated hand-held power tools. Ventilation slots 32 are also shown, as well as a charge control indicator 26 that indicates the charge state of a battery pack when one is plugged in.

Figure 4:
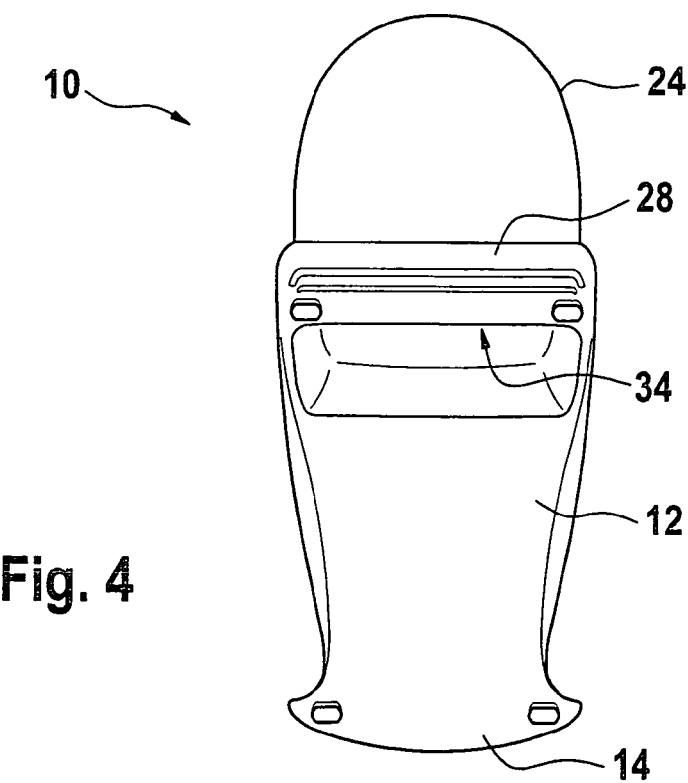
FIG. 4 shows the solar battery-charging station from underneath.

FIG. 4 shows the underside of the solar battery-charging station and the design of the handle 28 with a grasping opening 34.

FIG. 5 shows the front view of the solar battery-charging station 10; in addition to the details mentioned above, which are not discussed again here, FIG. 5 particularly shows the seven solar cell plates 20, which are electrically connected to one another, spread out like a fan.

On each solar cell plate, close to the swivel pin 22, the figure also shows a slip ring contact 36 via which the individual solar cell plates are electrically coupled to one another like links in a chain. This produces a series connection of the individual solar cell plates so that a charging current is present at the plug opening or at the charging terminal for battery packs and the intensity of this charging current is proportional to the total surface area of all seven solar cell plates.

If the solar battery-charging station according to FIG. 1 is folded together, then only a minimal charging current is present, which is proportional to the surface area of the top solar cell plate 20.

On their front side or top, the solar cell plates 20 have a light-converting layer, which feeds into a common electrical contact point. The back side, which is comprised of a mechanically stable substrate, is spaced apart from the neighboring solar cell plate 20 by an air gap to prevent the light-converting layer from being scratched when the stack 16 is spread out or folded together.

The electrical contact point is disposed at the bottom end of each solar cell plate 20 and constitutes a slip ring contact 36 there. On the front side, this slip ring contact is embodied in the form of an arc-shaped connecting link and on the back side, it is embodied in the form of an electrically conductive protrusion. Thus, each protrusion of a solar cell plate 20 engages in the arc-shaped connecting link of a neighboring solar cell plate 20 disposed underneath it in the stack 16.

The invention claimed is:

1. A solar cell plate for generating electric current, comprising:
a plurality of individual solar cell plates that can be moved in relation to one another by pivoting around a common axis, such that the plurality of individual solar cell plates are opened up in the manner of a fan into a fanned-out position or folded back into a compact position from the fanned-out position to form a small packing size, wherein in the fanned-out position, the plurality of individual solar cell plates form a maximum surface, wherein the plurality of individual solar cell plates are supported on a podium housing base having an inclined surface for maintaining an optimum angular position of the solar cell plates, wherein said podium housing base essentially has the contour of a single solar cell plate, wherein the podium housing base is hollow on the inside and is used as a battery-charging station, and wherein the podium housing base has a plug opening on its back side that is equipped with electrical contact pins and accommodates a battery.

2. The solar cell plate according to claim 1, wherein the individual solar cell plates form a stack, wherein the front side of each solar cell plate has a light-converting layer with a common electrical contact point, and wherein the back side, comprised of a mechanically stable substrate, is spaced apart from the neighboring solar cell plate by an air gap.

3. The solar cell plate according to claim 2, wherein the stack is comprised of oblong solar cell plates and has a pivot axis at one end, and the individual solar cell plates are connected to one another in chain fashion and can pivot in relation to one another around this pivot axis.

4. The solar cell plate according to claim 1, wherein the plurality of individual solar cell plates form a stack, and wherein when the stack of solar cell plates is spread out, a current is generated whose intensity is proportional to the total surface area of the solar cell plates.

* * * * *